Oct. 24, 1950
F. KUNREUTHER ET AL
2,526,881
CATALYTIC CONVERSION OF HYDROCARBONS
TO PRODUCE ALKYL NAPHTHALENES
Filed May 17, 1948
2 Sheets-Sheet 1
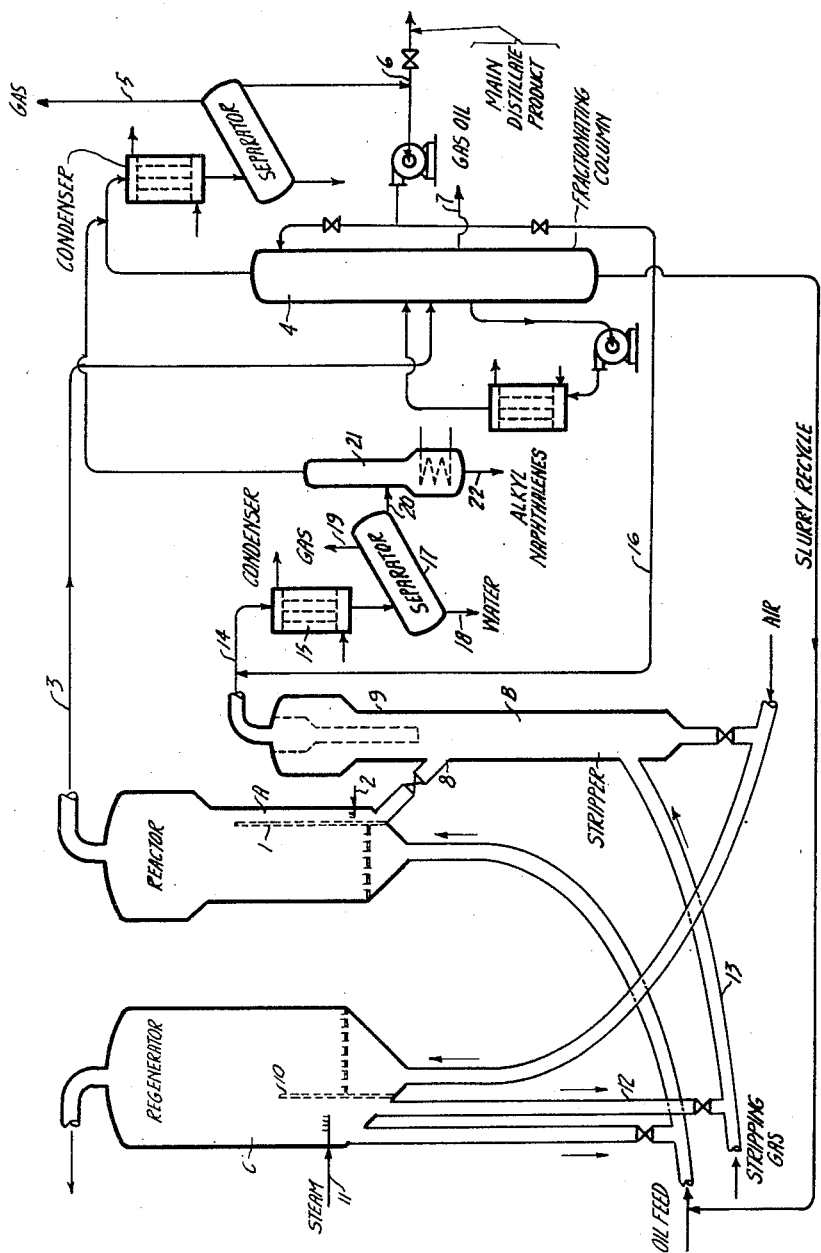
Fig. I
Inventors: Frederick Kunreuther
Richard P. Trainer
By their Attorney:

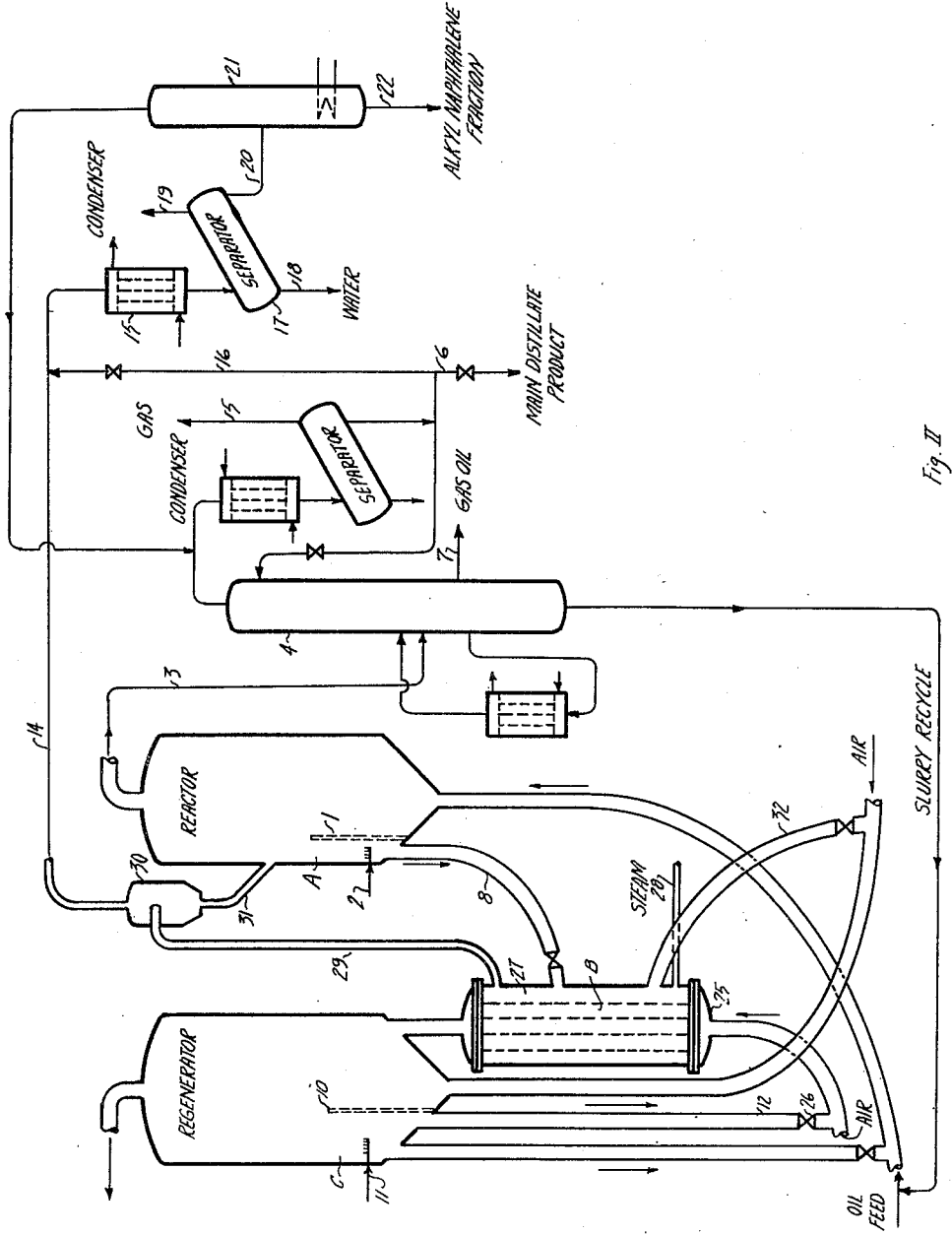
Fig. II
Inventors: Frederick Kunreuther
Richard P. Trainer
By their Attorney:

Patented Oct. 24, 1950

2,526,881

UNITED STATES PATENT OFFICE 2,526,881

CATALYTIC CONVERSION OF HYDROCARBONS TO PRODUCE ALKYL NAPHTHALENES

Frederick Kunreuther, Houston, Tex., and Richard P. Trainer, New York, N. Y., assignors to Shell Development Company, San Francisco, Calif., a corporation of Delaware Application May 17, 1948, Serial No. 27,424

1 Claim. (Cl. 196—52)

This invention relates to the catalytic conversions of oils boiling predominately above the gasoline boiling range into valuable products by the use of a powdered acidic oxide cracking catalyst. More particularly the invention relates to an improved method for the conversion of distillate oils whereby certain valuable by-products may be recovered in usable form while at the same time contributing toward the efficiency of the catalytic cracking process itself.

An object of the invention is to provide a process whereby a hydrocarbon fraction consisting essentially of valuable alkyl naphthalenes may be separately recovered as such in a usable form as a product of the process.

Another object of the invention is to provide a process wherein the cracking is more effectively carried out.

Another object of the invention is to provide a process wherein the regeneration of the spent catalyst may be carried out with less production of heat, less deactivation of the catalyst, and with smaller amounts of oxygen.

The type of reactions affording the products desired in the present process is caused to take place by acidic oxide cracking catalysts. The cracking reactions which take place when using an acidic oxide cracking catalyst are quite different than those taking place in the absence of a catalyst or in the presence of a different type of catalyst, e. g. aluminum chloride or activated carbon, and lead to the formation of different products. Any metal oxide or combination of metal oxides having an acidic character at least as pronounced as that of alumina leads to the desired type of cracking reactions. However, adsorptive acidic oxide catalysts having a microporous structure affording a large available surface, e. g. at least 50 m.$^2$/g are preferred in practical operation. The typical oxides of this class are those of boron, aluminum, silicon, titanium and zirconium. These are usually used in various combinations with each other and often with minor amounts of promoters such as magnesium oxide, chromium oxide, etc. Thus, the various activated clay cracking-catalysts and the various proprietary synthetic silica-base catalysts are suitable. A preferred catalyst of this type is, for example, an adsorptive synthetic gel catalyst consisting of about 75–90% silica and about 10–25% alumina (on the dry basis) and having a microporous structure affording a large surface. Since the acidic nature of these various catalysts is important, they are severely poisoned by the presence of even small amounts of alkalis, and consequently they are prepared substantially free of all but the smallest traces of sodium. The catalysts described are widely used at present and are so well known that furthed description of them does not appear to be warranted.

The process of the invention is one in which the catalyst of the described type is preferably employed in a finely divided state, e. g. a powder passing a 100 mesh sieve, and is recycled continuously through a cracking zone wherein it is contacted with the vapors of the oils to be cracked under cracking conditions, and through a separate regeneration zone wherein carbonaceous material deposited on the catalyst particles is removed by controlled burning. In processes of this type large amounts of catalysts are required to be circulated. Thus, for every unit weight of oil vapor entering the cracking zone there is usually recycled to said zone from about 3 up to about 30 unit weights of the powdered catalysts. This is necessary in order to provide the necessary large available cracking surface required to give the desired degree of cracking and also to provide the necessary heat to the reaction zone.

In order to allow the circulation of the catalyst it is necessary that the catalyst powder be continuously mixed with a stream of gas or vapor in an amount to maintain it in a fluidized, i. e. pseudo liquid, state. In the typical case the catalyst particles have an apparent density in the order of 1 g./cc. and, if fully compacted, the catalyst would, therefore, have a density of about 62.5 lbs. per cubic foot. The minimum density affording a fluidized state is in the order of 50% of the density of this fully compacted material. Therefore, the fluidized catalyst in the plant has in this typical case a maximum density of about 30 lbs. per cubic foot, and each cubic foot of the fluidized catalyst includes at least about one-half cubic foot of vapor surrounding and between the catalyst particles. The vapor mixture existing throughout the cracking zone at any instant is essentially uniform in composition and consists of a small amount of hydrogen, methane, $C_2$ and $C_3$ hydrocarbons, large amounts of $C_4$ hydrocarbons, large amounts of cracked gasoline vapors and considerable amounts of vapors of the uncracked feed. The fluidized catalyst withdrawn in large volumes from the cracking zone proper therefore carries with it a large amount of vapors of this composition. If this mixture were cycled directly to the regeneration zone a large amount of valuable hydrocarbons would be lost and the regeneration would be even more difficult than it is. To overcome this difficulty it is the practice to free the catalyst withdrawn from the reaction zone of as much of these occluded vapors as possible prior to passing the catalyst to the regeneration zone. This process is loosely referred to in the art as "stripping." This stripping is usually effected in practice by passing a so-called stripping gas, usually steam, into the bottom of the reaction vessel below the point of introduction of the oil feed. This gas displaces the hydrocarbon vapors occluded between the catalyst particles and also tends to remove some of the more volatile material adsorbed in the pores of the catalyst particles when large volumes of steam are applied. The stripping steam containing the displaced hydrocarbon vapors passes up through the reaction zone (cracking zone) where it acts as a diluent. This is shown in U. S. Patent No. 2,422,262. It has also been suggested to effect this so-called stripping in a separate vessel, passing the stripping gas along with the stripped material into the top part of the reaction vessel or into the product fractionating column. This is illustrated, for example, in U. S. Patent No. 2,422,793. The hydrocarbons separated from the withdrawn catalysts by these methods consist essentially of the same vapor mixture found in the cracking reaction zone with additional small amounts of more easily volatilized material desorbed from the catalyst pores and consequently it is combined with the main effluent of the cracking zone as described.

The displacement of the occluded hydrocarbon vapors is relatively easily accomplished. However, the catalyst after such stripping still contains some carbonaceous deposits in the pores. This residual carbonaceous material is very tenaciously held in the catalyst. The catalyst containing this residual material is therefore cycled to the regeneration zone where the carbonaceous deposits are burned. It is known, however, that this residual material is not pure carbon and is capable of being cracked to yield a small amount of light products. Since any reduction of residual carbon on the catalyst going through the regeneration zone is desirable it has, therefore, been suggested to "coke" the stripped catalyst as, for example, by allowing it to sit for a time in an enlarged "coking chamber" as described in U. S. Patent No. 2,391,336. The theory here is that if the carbonaceous deposits are allowed a sufficient contact time with the cracking catalyst some further cracking will take place to yield lower boiling hydrocarbons which are then easily stripped by a subsequent stripping treatment thereby reducing the amounts of carbonaceous deposits to be burned. It has also been suggested to truly coke the stripped catalyst by blowing it with hot partially spent regeneration gases in which case the residual oxygen burns some of the carbonaceous deposits and thereby increases the temperature sufficiently to coke the remainder. The stripped gas in this case contains carbon monoxide and is a very poor quality fuel gas. This method is described, for example, in U. S. Patent No. 2,408,943. The residual matter on the catalyst in either of these latter cases is substantially carbon.

It has now been found that if the occluded hydrocarbon vapors and the more volatile adsorbed material are first removed by displacement with a so-called stripping gas such as steam, it is possible to remove and recover from the catalyst a valuabe hydrocarbon fraction consisting almost entirely of alkyl naphthalenes. This fraction is separately removed by subjecting the catalyst to a separate stripping treatment at a temperature above that prevailing in the reaction (cracking) zone, but not so high, however, as to cause excessive cracking of the alkyl naphthalenes. Alkyl naphthalenes, when cracked with catalysts of the type in question, yield coke and gases of little value. Thus, the cracking of methyl naphthalene at 500° C. with a commercial silica-base cracking catalyst yields a gas having the following composition:

| | Per cent by weight |
|---|---|
| Hydrogen | 9.2 |
| $C_2$–$C_4$ olefins | 32.2 |
| $C_1$–$C_4$ paraffins | 58.5 |

There is no gasoline produced, and for each pound of such gas there is produced 4.6 lbs. of coke.

In order to avoid cracking the alkyl naphthalenes the temperature in the recovery step should not exceed the temperature prevailing in the cracking zone by more than about 100° F. In the preferred operation the temperature in the reaction zone (cracking zone) is between about 900° F. and 1010° F. and the temperature in the stripping step to remove the alkyl naphthalenes is between 35° F. and 100° F. above that prevailing in the cracking zone. The product removed from the catalyst by this treatment is separately recovered. This product consists almost completely of alkyl naphthalenes and is a valuable by-product of the process. It is the substantial equivalent of the product described in U. S. Patent No. 2,374,387. It is also an excellent material for the production of phthalic anhydride by the process of U. S. Patent No. 2,425,398.

The alkyl naphthalene fraction recovered as described is not only a valuable by-product, but its removal and separate recovery is beneficial to the process itself. Thus, by removing the alkyl naphthalenes as described, the regeneration requirements are reduced. If the alkyl naphthalenes were cracked only a small fraction of their weight would be removed as a gas of little value and a large part would remain on the catalyst as coke. The seperate recovery of the alkyl naphthalenes is also advantageous as compared to combining them with the main product of the cracking process since if they are removed from the catalyst and added to the main cracked product they accumulate in the higher boiling recycle oil and tend to increase the coke deposition.

The fact that the material removed and separately recovered in the process of the invention consists practically completely of alkyl naphthalenes is not easily explained. Alkyl naphthalenes are not present in any appreciable amounts in the petroleum oils used as feed stocks in catalytic cracking. On the other hand, it is known that when various oils are cracked with acidic oxide catalysts the whole gamut of polynuclear aromatic hydrocarbons is formed and a product consisting practically entirely of alkyl naphthalenes could not be expected.

In the above the process of the invention has been explained in general terms. The method by which the process may be carried out will now be described. To aid in this description reference will be had to the attached drawing wherein:

Figure I is a semidiagrammatic flow diagram of a cracking plant embodying the invention, wherein the catalyst is heated to the desired stripping temperature by direct heat exchange with hot regenerated catalyst, and Figure II is a semidiagrammatic flow diagram of a cracking plant embodying the invention, wherein the catalyst is heated to the desired stripping temperature by indirect heat exchange with hot regenerated catalyst.

As pointed out above, after the occluded hydrocarbon vapors are removed from the fluidized catalyst, the catalyst is stripped at a temperature above that prevailing in the cracking zone. In a typical case the amount of catalyst handled is in the order of 10–30 tons per minute. This catalyst can be heated to the desired temperature by a conventional heater; it is desired, however, to bring the catalyst up to the desired stripping temperature as quickly as possible in order to avoid cracking of the adsorbed alkyl naphthalenes. The necessary heating of the catalyst can best be effected in the manners illustrated.

Referring to Figure I, it is seen that the plant is a modification of a conventional down-flow cracking plant. The fluidized catalyst in the cracking reactor flows over the partition or wier 1 into the primary stripping zone A wherein it passes downwardly countercurrent to an inert stripping gas introduced by line 2. This gas, which is usually steam, displaces the hydrocarbon vapors in the fluidized catalyst, carrying them upward into the upper section of the cracking reactor where they mix with the product vapors withdrawn via line 3 to the main fractionating column 4. In fractionating column 4 the product is fractionated in the conventional manner into a gaseous fraction withdrawn via line 5, a main distillate product withdrawn via line 6, a gas oil fraction withdrawn via line 7, and a bottom fraction containing catalyst fines which is recycled with the fresh feed oil to the cracking reactor.

The spent catalyst, freed of occluded hydrocarbons, is withdrawn from the primary stripping zone via line 8 to the secondary stripping zone B in stripper 9. This catalyst enters the secondary stripping zone at substantially the temperature prevailing in the cracking zone, e. g. 925° F. The secondary stripping zone is, however, maintained at a temperature which is 35 to 100° F. higher by the addition of a controlled amount of hot catalyst from the regenerator. Thus, freshly regenerated catalyst at a temperature of, for example, 1110° F. flows over the wier 10 in the regenerator into an internal stripping zone C. A stripping gas such as steam is introduced via line 11 to displace any occluded oxygen-containing regeneration gas. The main part of this hot regenerated catalyst is cycled to the catalytic cracking zone in the conventional manner. A controlled amount is, however, separately withdrawn via standpipe 12. This hot catalyst is picked up by the stripping steam and carried via line 13 to the secondary stripping zone. The catalyst in the secondary stripping zone is maintained in a fluidized or dispersed state by the stripping steam. The hot regenerated catalyst therefore intermingles with the spent catalyst in the stripping zone and allows a substantially uniform and controlled temperature to be easily maintained. The spent catalyst entering the secondary stripping zone is therefore heated to the desired stripping temperature in a few seconds and cracking of the alkyl naphthalenes is minimized.

The stripping gas used in the secondary stripping zone may be any inert stripping gas. However, it is usually steam and steam is used in the operation illustrated. The stripping steam carrying the stripped alkyl naphthalenes is passed from the secondary stripping zone by line 14 to a condenser 15. The alkyl naphthalenes separated from the catalyst in the secondary stripping zone have a density about equal to or slightly greater than water. In order to facilitate separation of the alkyl naphthalenes from the water it is desirable to add a less dense hydrocarbon or other water-immiscible solvent. Thus, in the flow illustrated a portion of the main distillate product (of the nature of gasoline) is cycled via line 16 to line 14. The condensate consisting of the alkyl naphthalenes, added gasoline and water is then passed to separator 17. The water condensate and any uncondensed gas are withdrawn via lines 18 and 19, respectively. The mixture of gasoline and alkyl naphthalenes is then passed via line 20 to a small still 21. The gasoline, being of much lower boiling range, is taken off overhead and is returned to the main distillate product. The alkyl naphthalenes are removed as the bottom product via line 22.

In the modification illustrated in Figure II the temperature in the secondary stripping zone is maintained at the desired level by indirect heat exchange with hot catalyst from the regenerator. Most of the flow lines and auxiliary apparatus are the same as those shown in Figure I and have therefore been given the same reference numbers. In this modification hot regenerated catalyst withdrawn via line 12 from the regenerator is continuously picked up by air and recycled to the regenerator through the indirect heat exchanging stripping apparatus 25. The amount of catalyst recycled is controlled to give the desired temperature in the stripping zone by adjusting the valve 26. The spent catalyst is withdrawn from the reactor and stripped of occluded hydrocarbon vapors as previously described. This catalyst flows via line 8 to the secondary stripping zone B. In the apparatus diagrammatically illustrated the secondary stripping takes place in the space between and surrounding the tubes 27. Stripping gas such as steam is injected into the lower part of the secondary stripping zone via line 28. In practice the stripping gas is preferably introduced at a plurality of points but for the sake of clearness only one point of injection is illustrated in the flow diagram. The level of fluidized catalyst in the secondary stripping zone is maintained between the level of the spent catalyst inlet and the stripping gas outlet (line 29). In this modification some catalyst is carried from the stripping zone with the stripping gas. The stripping gas carrying the alkyl naphthalenes and the small amount of suspended catalyst is therefore preferably passed to a centrifugal separator 30. The catalyst separated in separator 30 may be returned to the main catalyst stream at any convenient point. In the modification illustrated this catalyst is returned to the reactor via line 31. The stripping steam containing the alkyl naphthalenes is then mixed with lighter hydrocarbons, condensed, and separated as previously described.

The stripped catalyst is withdrawn from the stripper via line 32 and is then passed to the regenerator in the conventional way. The residual carbonaceous matter in the stripped catalyst is not only lower than when employing the conventional stripping in the stripping zone A but is also lower than it would be if the alkyl naphthalenes were cracked off (coked) at higher temperatures since, as pointed out, only a part of the combustible content of alkyl naphthalenes is removed by cracking or coking. The process of the present invention therefore also results in a substantial improvement in the catalytic cracking process itself.

The improvement and combination which are considered to be the invention or discovery are particularly pointed out and distinctly claimed in the following claim.

We claim as our invention:

In a process for the catalytic treatment of vapors of a hydrocarbon oil with an adsorptive siliceous cracking catalyst in a treating zone maintained at a cracking temperature and wherein the catalyst is continuously recycled through said treating zone and through a separate regeneration zone wherein carbonaceous deposits are removed from the catalyst at a temperature above that prevailing in said treating zone, the combination of steps comprising: (1) continuously withdrawing partially spent catalyst from said treating zone while continuously replacing interstitial hydrocarbon vapors with a stripping gas in a first preliminary stripping zone; (2) continuously feeding the resulting mixture of partially spent catalyst and stripping gas into the upper part of a second, separate stripping zone; (3) continuously withdrawing stripped catalyst from the bottom of said second stripping zone and transferring the same to said regeneration zone; (4) continuously withdrawing hot partially regenerated catalyst from said regeneration zone, suspending the same in steam and introducing the resulting suspension into said second stripping zone at a point near the bottom thereof, the amount of said hot partially regenerated catalyst so introduced into said second stripping zone being adjusted to maintain the temperature in said stripping zone between 35° F. and 100° F. above the temperature in said treating zone; (5) withdrawing the resulting mixture of steam and stripped material from the top of said stripping zone; (6) adding a hydrocarbon distillate of the nature of gasoline to the said mixture withdrawn from the top of said stripping zone, separating water from the liquid hydrocarbon mixture after cooling and (7) distilling the remaining hydrocarbon mixture to remove said added hydrocarbon thereby to recover a stripped product consisting essentially of alkyl naphthalenes.

FREDERICK KUNREUTHER.
RICHARD P. TRAINER.

REFERENCES CITED

The following references are of record in the file of this patent:

UNITED STATES PATENTS

| Number | Name | Date |
|---|---|---|
| 1,879,849 | Hunter | Sept. 27, 1932 |
| 2,335,596 | Marschner | Nov. 30, 1943 |
| 2,461,343 | Ogorzaly et al. | Feb. 8, 1949 |
| 2,408,943 | Mekler | Oct. 8, 1946 |
| 2,451,619 | Hengstebeck et al. | Oct. 19, 1948 |
| 2,461,343 | Ogorzaly et al. | Feb. 8, 1949 |